United States Patent
Tie et al.

(10) Patent No.: US 8,510,565 B2
(45) Date of Patent: Aug. 13, 2013

(54) BIDIRECTIONAL ENTITY AUTHENTICATION METHOD BASED ON THE CREDIBLE THIRD PARTY

(75) Inventors: Manxia Tie, Shaanxi (CN); Jun Cao, Shaanxi (CN); Xiaolong Lai, Shaanxi (CN); Zhenhai Huang, Shaanxi (CN)

(73) Assignee: China IWNComm Co., Ltd., Xi'an (CN)

( * ) Notice: Subject to any disclaimer, the term of this patent is extended or adjusted under 35 U.S.C. 154(b) by 258 days.

(21) Appl. No.: 12/920,931

(22) PCT Filed: Mar. 4, 2009

(86) PCT No.: PCT/CN2009/070629
§ 371 (c)(1),
(2), (4) Date: Sep. 3, 2010

(87) PCT Pub. No.: WO2009/109136
PCT Pub. Date: Sep. 11, 2009

(65) Prior Publication Data
US 2011/0004767 A1    Jan. 6, 2011

(30) Foreign Application Priority Data
Mar. 6, 2008    (CN) .......................... 2008 1 0017646

(51) Int. Cl.
*H04L 9/32*    (2006.01)
(52) U.S. Cl.
USPC .............. 713/178; 713/155; 713/166; 726/19
(58) Field of Classification Search
None
See application file for complete search history.

(56) References Cited

U.S. PATENT DOCUMENTS

| 7,155,608 | B1 | 12/2006 | Malik et al. |
| 7,266,684 | B2 * | 9/2007 | Jancula ......................... 713/156 |

(Continued)

FOREIGN PATENT DOCUMENTS

| CN | 1625103 A | 6/2005 |
| CN | 1929380 A | 3/2007 |

(Continued)

OTHER PUBLICATIONS

Akihiro Yamamura. "Safety assessment of the ISO / IEC 9798 protocol." Graduate School of Engineering, Akita University Graduate School Resources. Feb. 4, 2011. Abstract translation provided by Unitalen Attorneys At Law.

(Continued)

*Primary Examiner* — Kaveh Abrishamkar
(74) *Attorney, Agent, or Firm* — Harness, Dickey & Pierce, P.L.C.

(57) ABSTRACT

A bidirectional entity authentication method based on the credible third party includes the steps that: entity A receives message 1 sent from entity B including the authentication parameters of said entity B, and sends message 2 to the credible third party TP, said message 2 including the authentication parameters of entity B and the authentication parameters of entity A; entity A receives message 3 sent from said credible third party TP, said message 3 including the checking result after checking that whether said entity A and entity B are legal based on said message 2 by said credible third party TP; entity A gets the authentication result of entity B after authenticating said message 3, and sends message 4 to said entity B to make entity B authenticating based on said message 4 and getting the authentication result of entity A. The invention simplifies the operation condition of the protocol, reduces the computing capability requirement of the authentication entity, and satisfies the high security requirement of the network device lack of resource.

14 Claims, 1 Drawing Sheet

(56) References Cited

U.S. PATENT DOCUMENTS

| | | | |
|---|---|---|---|
| 7,697,692 B2 | 4/2010 | Takata et al. | |
| 8,195,935 B2 | 6/2012 | Tian et al. | |
| 2002/0032654 A1* | 3/2002 | Egendorf | 705/40 |
| 2006/0053296 A1* | 3/2006 | Busboom et al. | 713/182 |
| 2007/0289006 A1* | 12/2007 | Ramachandran et al. | 726/10 |

FOREIGN PATENT DOCUMENTS

| | | |
|---|---|---|
| CN | 101064605 A | 10/2007 |
| CN | 101247223 | 8/2008 |
| JP | 8297638 A | 11/1996 |
| JP | 8335208 A | 12/1996 |
| JP | 2005535006 A | 11/2005 |
| JP | 2006238273 A | 9/2006 |
| WO | WO-03100544 A2 | 12/2003 |
| WO | WO-2007131426 A1 | 11/2007 |

OTHER PUBLICATIONS

"Survey on 'Status of Identity Authentication Technologies.'" Security Center of information-technology Promotion Agency, Japan. Mar. 2003. Translation provided by Unitalen Attorneys At Law.

* cited by examiner

BIDIRECTIONAL ENTITY AUTHENTICATION METHOD BASED ON THE CREDIBLE THIRD PARTY

The present application claims the priority of Chinese Patent Application No. 200810017646.5, filed with the Chinese Patent Office on Mar. 6, 2008, entitled as "A UTILITY BIDIRECTIONAL ENTITY AUTHENTICATION METHOD BASED ON THE TRUSTED THIRD PARTY", the entire contents of which are incorporated herein by reference.

FIELD OF THE INVENTION

The present invention relates to a utility bidirectional entity authentication method based on the trusted third party.

BACKGROUND OF THE INVENTION

Entity authentication methods adopting asymmetric cryptographic technology may be divided into two types: unidirectional authentication and bidirectional authentication. Uniqueness or timeliness of the authentication is identified by time-varying parameters that typically include a time stamp, a sequence number and a random number, etc. If a time stamp or a sequence number is used as a time-varying parameter, a unidirectional authentication needs performing one pass authentication and the bidirectional authentication needs performing two pass authentication; if a random number is used as the time-varying parameter, a unidirectional authentication needs performing two pass authentication and a bidirectional authentication needs performing three pass authentication or four pass authentication (i.e., two parallel unidirectional authentication procedures).

No matter which one of the above authentication mechanisms is adopted, a verifier has to have a valid public key of a claimer, and otherwise, the authentication process will be damaged or can not finish successfully. Here, an explanation will be given by taking the method of three pass authentication in the bidirectional authentication for example:

Referring to FIG. 1, tokens TokenAB=$R_A\|R_B\|B\|Text3\|sS_A$ ($R_A\|R_B\|Text2$), TokenBA=$R_B\|R_A\|A\|Text5\|sS_B$ ($R_B\|R_A\|A\|Text4$) are shown. Where X is an entity distinguishing identifier, and the authentication system has two authentication entities which are A and B. $Cert_X$ denotes a certificate of the entity X; $sS_X$ denotes a sign of the entity X; $R_X$ denotes a random generated by the entity X and Text is an optional text field.

The authentication mechanism of three pass authentication operates as follows in detail:

1) The entity B sends a random number $R_B$ and an option text Text1 to the entity A;

2) The entity A sends a token TokenAB and an option certificate $Cert_A$ to the entity B;

3) Upon receiving the message sent from the entity A, the entity B performs the following steps of:

3.1) ensuring having the valid public key of the entity A by checking the certificate of the entity A or by other methods;

3.2) after obtaining the public key of the entity A, verifying the sign of the TokenAB in the step 2), verifying the correctness of the distinguishing identifier B and checking whether the random number $R_B$ sent in the step 1) is consistent with the random number $R_B$ in the TokenAB, finishing the verification of the entity A by the entity B;

4) The entity B sends a token TokenBA and an option certificate $Cert_B$ to the entity A;

5) After receiving the message including the TokenBA sent from the entity B, the entity A performs the following steps of:

5.1) ensuring having the valid public key of the entity B by checking the certificate of the entity B or by other methods;

5.2) after obtaining the public key of the entity B, verifying the sign of the TokenBA in the step 4), verifying the correctness of the distinguishing identifier A and checking whether the random number $R_A$ sent in the step 2) is consistent with the random number $R_A$ in the TokenBA and whether the random number $R_B$ received in step 1) is consistent with the random number $R_B$ in the TokenBA, finishing the verification of the entity B by the entity A.

As can be seen, the authentication mechanism of three pass authentication must ensure that the each one of entities A and B has the valid public key of the other side respectively in order to operate successfully. However, how to obtain the public key of the other side and its validity is not included in the protocol. This ensuring requirement condition can not be satisfied in many current application circumstances, for example, in a communication network, an entity authentication mechanism is generally used for implementing the function of the user access control, and before the authentication mechanism is completed successfully, the user is forbidden to access the network, therefore, the user can not or have difficulty to access a certificate institution to obtain the other side entity (the validity of the public key of the network access point) before the authentication.

Generally, in the current communication network, the bidirectional authentication needs to be implemented between the user and the network access point so as to ensure that a legal user accesses a legal network. Therefore, as to a network entity, if there is no need to know the valid public key of the opposite entity in the communication before authentication, and the verifying of the public key of the opposite entity is implemented during the authentication, then the conventional entity authentication mechanism is not only improved, but also provided with better feasibility and usability in the practical applications. In addition, no matter which one of the above authentication mechanisms is adopted, there is a need for the authentication entity to perform a calculation of the public key. However, the calculation of the public key takes a lot of time, which, for an authentication entity with a relatively weak computation capacity, causes the authentication protocol difficult to be applied. Therefore, during the design of the protocol, the calculation of the public key of the authentication entity should be performed as less times as possible while ensuring the authentication function.

SUMMARY OF THE INVENTION

In order to solve the above technology problems in the Background of the Invention, the present invention provides a utility bidirectional entity authentication method based on the trusted third party.

The technical solution of the invention includes:

a utility bidirectional entity authentication method based on the trusted third party, including:

after receiving, from an entity B, a message 1 including an authentication parameter of the entity B, an entity A sends to a trusted third party TP a message 2, the message 2 including the authentication parameter of the entity B and the authentication parameter of the entity A;

the entity A receives a message 3 sent from the trusted third party TP, the message 3 including a checking result obtained by checking whether the entities A and B are legal by the trusted third party TP on the basis of the message 2;

the entity A obtains a verification result of the entity B after verifying the message 3, sends a message 4 to the entity B for causing the entity B to perform verification based on the message 4 and obtaining the verification result of the entity A.

The message 1 includes a time-varying parameter $R_B$, an identity $ID_B$, a token TokenBA, an option text Text1.

The message 2 includes time-varying parameters $R_A$ and $R_B$, identities $ID_A$ and $ID_B$, tokens TokenAT and TokenBA, option texts Text1 and Text2.

The message 3 includes a token TokenTA and an option text Text3 or includes tokens TokenTA1 and TokenTA2.

The message 4 includes a token TokenTA and an option text Text3 or includes a token TokenTA2.

Checking whether the entities A and B are legal includes:

if the identities $ID_A$ and $ID_B$ of the entities A and B in the message 2 are certificates, verifying the signs of the entities B and A in the Tokens TokenBA and TokenAT, if the verification is not successful, discarding the message 2 directly; and if the verification is successful, checking the validity of the certificates;

if the certificates are invalid, discarding the message 2 directly or returning the message 3; if the certificates are valid, returning the message 3 to the entity A.

Checking whether the entities A and B are legal includes:

if the identities $ID_A$ and $ID_B$ of the entities A and B in the message 2 are distinguishing identifiers, searching and checking the corresponding public keys of the entities A and B and their validity, if the corresponding public keys can not be searched out or the searched out corresponding public keys are invalid, discarding the message 2 directly or returning the message 3; if the corresponding public keys are searched out and the searched out corresponding public keys are valid, verifying the signs of the entities B and A in the tokens TokenBA and TokenAT;

if the verification of the signs is not successful, discarding the message 2 directly; and if the verification of the signs is successful, returning the message 3 to the entity A.

Verifying the message 3 by the entity A includes:

the entity A verifies the sign of the trusted third party TP in the TokenTA or TokenTA1, and checking whether the time-varying parameter $R_A$ in the message 2 is consistent with the time-varying parameter $R_A$ in the TokenTA or TokenTA1, if yes, obtains the verification result $Pub_B$ of the entity B.

Performing verification based on the message 4 by entity B including:

the entity B verifies the sign of the trusted third party TP in the TokenTA or TokenTA2, and checking whether the time-varying parameter $R_B$ in the message 1 is consistent with the time-varying parameter $R_B$ in the TokenTA or TokenTA2, if yes, obtains the verification result $Pub_A$ of the entity A.

Before the entity A receives the message 1 sent from the entity B, the method further includes:

the entity A sends a message 0 including an authentication parameter of the entity A to the entity B, the entity B sends the message 1 to the entity A after the reception of the message 0.

The message 0 includes a time-varying parameter $R_A$, an identity $ID_A$ and an option text Text0.

The time-varying parameter is a random number, a time stamp or a sequence number.

In the present invention, three-entity architecture is adopted. The authentication entities is required to obtain the public key or certificate of the trusted third party before the authentication, and obtain a user certificate issued from the trusted third party or give the public key of itself to the trusted third party for safekeeping, without the need of knowing the valid public key of the opposite authentication entity in advance. During the operation of the protocol, the public key of the authentication entity and its validity are transmitted automatically to the required opposite side through the searching and verifying by the trusted third party; and during the operation of the protocol, the sign verification of the authentication entity had better be implemented by the trusted third party generally having higher calculation capacity. Comparing with the conventional authentication mechanism, the present invention defines on-line search and authentication mechanism for the public key, realizes a centralized management of the public key, simplifies the operation conditions of the protocol and decreases the requirement of the calculation capacity for the authentication entity, which may satisfy the high security requirement of the network device lack of resources.

DETAILED DESCRIPTION OF THE EMBODIMENTS

Figure 1:
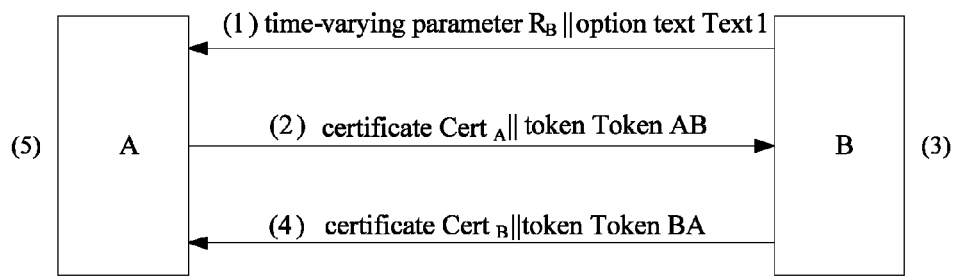
FIG. 1 is a schematic diagram of the authentication using the authentication mechanism of transmitting for three times in the prior art.
Figure 2:
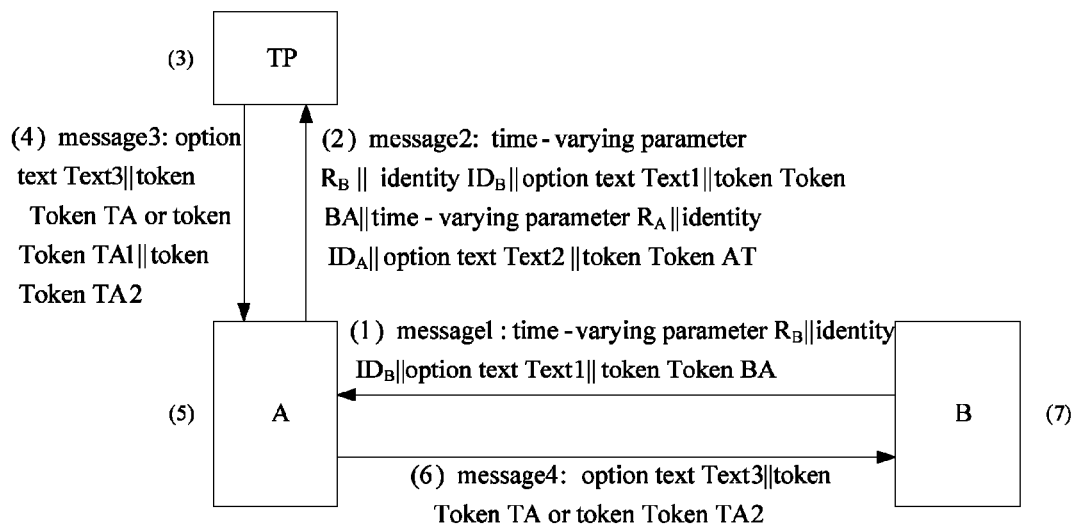
FIG. 2 is a schematic diagram of the authentication according to the present invention.

Referring to FIG. 2, the method of the present invention relates to three entities, i.e., two authentication entities A and B and a trusted third party TP, the trusted third party TP being the trusted third party of the authentication entities A and B. A system in which the peer authentication between two entities A and B is implemented by the trusted third party TP is referred to as Tri-element Peer Authentication (TePA) system. In the FIG. 2, $Valid_X$ denotes the validity of a certificate $Cert_X$; $PublicKey_X$ is a public key of the entity X; $ID_X$ is an identity of the entity X, which is expressed by the certificate $Cert_X$ or the distinguishing identifier X of the entity; $Pub_X$ denotes the verification result of the entity X, which is constituted by the certificate $Cert_X$ and its validity $Valid_X$ or by the entity X and its public key $PublicKey_X$, Token is a token field as defined as follows:

$$TokenBA = sS_B(R_B\|ID_B\|Text1))$$

$$TokenAT = sS_A(R_A\|R_B\|ID_A\|ID_B\|Text2)$$

$$TokenTA = R_A\|R_B\|Pub_B\|Pub_B\|sS_{TP}(R_A\|R_B\|Pub_A\|Pub_B\|Text3)$$

$$TokenTA1 = R_A\|Pub_B\|Text4\|sS_{TP}(R_A\|Pub_B\|Text4)$$

$$TokenTA2 = R_B\|Pub_A\|Text5\|sS_{TP}(R_B\|Pub_A\|Text5)$$

The particular procedure includes:

1) the entity B sends to the entity A a message 1 including a time-varying parameter $R_B$, an identity $ID_B$, a token TokenBA and an option text Text1;

2) the entity A sends to the trusted third party TP a message 2 after reception of the message 1, the message 2 including time-varying parameters $R_A$ and $R_B$, identities $ID_A$ and $ID_B$, tokens TokenBA and TokenAT and option texts Text1 and Text2;

3) the trusted third party TP checks whether the entities A and B are legal after reception of the message 2;

if the identities of the entities A and B in the message 2 are certificates, verifying the signs of the entities B and A in the tokens TokenBA and TokenAT, if the verification is not successful, discarding the message 2 directly; otherwise, checking the validity of the certificates of the entities A and B; if they are invalid, discarding the message 2 directly or returning the message 3, and if they are valid, returning the message 3 and performing the step 4);

if the identities of the entities A and B in the message 2 are distinguishing identifiers, searching and checking the corresponding public keys of the entities A and B and their validity, if the corresponding public keys can not be searched out or the public keys are invalid, discarding the message 2 directly or returning the message 3; if the they are searched out and are valid, verifying the signs of the entities B and A in the TokenBA and TokenAT; if the verification is not successful, discarding the message 2 directly; and if the verification is successful, returning the message 3 and performing the step 4);

4) after checking the legality of the entities A and B, the trusted third party TP returning the message 3 to the entity A, the message 3 including the token TokenTA and the option text Text3 or including tokens TokenTA1 and TokenTA2;

5) after receiving of the message 3, the entity A performs verification, i.e., verifying the sign of the trusted third party TP in the TokenTA or TokenTA1, and checking whether the time-varying parameter $R_A$ in the message 2 is consistent with the time-varying parameter $R_A$ in the TokenTA or TokenTA1, if yes, obtaining the verification result $Pub_B$ of the entity B;

6) after verifying of the message 3, the entity A sends the message 4 to the entity B, the message 4 including the token TokenTA and the option text Text3 or including token TokenTA2;

7) after receiving of the message 4, the entity B performs verification, i.e., verifying the sign of the trusted third party TP in the TokenTA or TokenTA2, and checking whether the time-varying parameter $R_B$ in the message 1 is consistent with the time-varying parameter $R_B$ in the TokenTA or TokenTA2, if yes, obtaining the verification result $Pub_A$ of the entity A.

It should be noted that:

1. The time-varying parameter in the present invention may be a random number, a time stamp or a sequence number.

2. In some cases, for facilitating performing the protocol, the start of the protocol may be activated by the entity A, that is, the entity A sends a message 0 to the entity B firstly, and the entity B starts to perform the above seven steps after reception of the message 0. Here, the message 0 includes a time-varying parameter $R_A$, an identity $ID_A$, option text Text0, and the token TokenBA in the message 1 may be expressed as:

$$TokenBA = sS_B(R_A \| R_B \| ID_A \| ID_B \| Text1).$$

The invention claimed is:

1. A utility bidirectional entity authentication method based on a trusted third party, comprising:
sending, by an entity B, a message 1 comprising an authentication parameter of the entity B to an entity A;
sending, by the entity A, a message 2 to a trusted third party TP, the message 2 comprising the authentication parameter of the entity B and an authentication parameter of the entity A;
receiving, by the entity A, a message 3 sent from the trusted third party TP, a checking result is comprised in the message 3 which is obtained by checking whether the entities A and B are legal by the trusted third party TP on a basis of the message 2; and
verifying the message 3, by the entity A, so as to obtain a verification result of the entity B, sending a message 4 to the entity B, by the entity A, for causing the entity B to perform verification based on the message 4 and obtaining a verification result of the entity A.

2. The method according to claim 1, wherein the message 1 includes a time-varying parameter $R_B$, an identity $ID_B$, a token TokenBA, an option text Text1;
the message 2 includes time-varying parameters $R_A$ and $R_B$, identities $ID_A$ and $ID_B$, tokens TokenAT and TokenBA, option texts Text1 and Text2;
the message 3 includes a token TokenTA and an option text Text3 or includes tokens TokenTA1 and TokenTA2; and
the message 4 includes a token TokenTA and an option text Text3 or includes a token TokenTA2.

3. The method according to claim 2, wherein checking whether the entities A and B are legal comprises:
if the identities $ID_A$ and $ID_B$ of the entities A and B in the message 2 are certificates, verifying signs of the entities B and A in the TokenBA and TokenAT, if the verification is not successful, discarding the message 2 directly; and if the verification is successful, checking a validity of the certificates; and
if the certificates are invalid, discarding the message 2 directly or returning the message 3; if the certificates are valid, returning the message 3 to the entity A.

4. The method according to claim 2, wherein checking whether the entities A and B are legal comprises:
if the identities $ID_A$ and $ID_B$ of the entities A and B in the message 2 are distinguishing identifiers, searching and checking corresponding public keys of the entities A and B and their validity, if the corresponding public keys cannot be searched out or the searched out corresponding public keys are invalid, discarding the message 2 directly or returning the message 3; if the corresponding public keys are searched out and the searched out corresponding public keys are valid, verifying signs of the entities B and A in the TokenBA and TokenAT;
if the verification of the signs is not successful, discarding the message 2 directly; and if the verification of the signs is successful, returning the message 3 to the entity A.

5. The method according to claim 2, wherein verifying the message 3 by the entity A comprises:
verifying, by the entity A, the sign of the trusted third party TP in the TokenTA or TokenTA1, and checking whether the time-varying parameter $R_A$ in the message 2 is consistent with the time-varying parameter $R_A$ in the TokenTA or TokenTA1, if yes, obtaining a verification result $Pub_B$ of the entity B.

6. The method according to claim 2, wherein performing verification, by the entity B, based on the message 4 comprises:
verifying, by the entity B, a sign of the trusted third party TP in the TokenTA or TokenTA2, and checking whether the time-varying parameter $R_B$ in the message 1 is consistent with the time-varying parameter $R_B$ in the TokenTA or TokenTA2, if yes, obtaining a verification result $Pub_A$ of the entity A.

7. The method according to claim 1, wherein, before the entity A receives the message 1 sent from the entity B, the method further comprises:
sending, by the entity A, a message 0 comprising an authentication parameter of the entity A to the entity B, sending, by the entity B the message 1 to the entity A after reception of the message 0.

8. The method according to claim 7, wherein the message 0 comprises a time-varying parameter $R_A$, an identity $ID_A$ and an option text Text0.

9. The method according to claim 2, wherein the time-varying parameter is a random number, a time stamp or a sequence number.

10. The method according to claim 3, wherein the time-varying parameter is a random number, a time stamp or a sequence number.

11. The method according to claim 4, wherein the time-varying parameter is a random number, a time stamp or a sequence number.

12. The method according to claim 5, wherein the time-varying parameter is a random number, a time stamp or a sequence number.

13. The method according to claim 6, wherein the time-varying parameter is a random number, a time stamp or a sequence number.

14. The method according to claim 8, wherein the time-varying parameter is a random number, a time stamp or a sequence number.

* * * * *